United States Patent
Omiya et al.

(10) Patent No.: US 7,497,509 B2
(45) Date of Patent: Mar. 3, 2009

(54) EXTERIOR COMPONENT

(75) Inventors: Yoshimasa Omiya, Aichi-ken (JP);
Daiichiro Kawashima, Aichi-ken (JP);
Yoshiaki Shichida, Aichi-ken (JP);
Koichi Sato, Aichi-ken (JP); Mitsunari Tanaka, Suzuka (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 414 days.

(21) Appl. No.: 11/369,001

(22) Filed: Mar. 7, 2006

(65) Prior Publication Data
US 2006/0214474 A1  Sep. 28, 2006

(30) Foreign Application Priority Data

Mar. 8, 2005 (JP) .............................. 2005-064527
Mar. 31, 2005 (JP) .............................. 2005-101414
Nov. 30, 2005 (JP) .............................. 2005-347047

(51) Int. Cl.
B62D 33/00 (2006.01)

(52) U.S. Cl. ........................ 296/198; 296/39.1; 442/389; 181/290; 428/113

(58) Field of Classification Search ............... 296/39.3, 296/39.1, 198; 280/762, 770, 847, 848, 850; 442/327, 389; 181/290; 428/113
See application file for complete search history.

(56) References Cited

U.S. PATENT DOCUMENTS 5,280,960 A  1/1994  Casey 6,641,194 B2 * 11/2003 Fujii et al. ............... 296/39.3
2004/0248490 A1  12/2004  Hyuga et al.

FOREIGN PATENT DOCUMENTS

| JP | A-10-088459 | 4/1998 |
|---|---|---|
| JP | A-2000-264255 | 9/2000 |
| JP | A-2004-142675 | 5/2004 |
| JP | A-2004-299626 | 10/2004 |
| JP | A-2004-359066 | 12/2004 |

OTHER PUBLICATIONS

Office Action dated May 9, 2008 in corresponding Chinese patent application No. 2007100801758.
Office Action dated Jul. 4, 2008 in corresponding Chinese patent application No. 2006100668441.

* cited by examiner

Primary Examiner—Joseph D Pape
(74) Attorney, Agent, or Firm—Posz Law Group, PLC

(57) ABSTRACT

A fender liner includes a surface layer serving as the outermost layer and an inner layer located between the surface layer and the outer surface of a wheel well. The surface layer and the inner layer are formed of nonwoven fabric. The nonwoven fabric forming the inner layer has a higher tensile strength than that of the nonwoven fabric forming the surface layer. Accordingly, the fender liner has a favorable noise reduction capability, and has a sufficient rigidity to bear a weight increase due to water absorption. Alternatively, the nonwoven fabric forming the surface layer may have a higher bulk specific gravity and a smaller fiber diameter than those of the nonwoven fabric forming the inner layer. In this case, the noise reduction capability and the durability are both improved.

33 Claims, 3 Drawing Sheets

EXTERIOR COMPONENT

BACKGROUND OF THE INVENTION

The present invention relates to an exterior component attached to a lower part of a vehicle body, such as a fender liner and an under protector that are attached to the lower part of the exterior of vehicle body.

Generally, exterior components such as fender liners and under protectors cover are attached to the lower part of a vehicle to protect the bottom from soiling of rain water and mud, and scratches by thrown up pebbles and gravel. In terms of guaranteeing a sufficient rigidity that endures soiling and scratches, such exterior components are made hard using materials such as synthetic resin and synthetic rubber. However, such a hard exterior component produces impact noise (chipping noise) when hit by rain water, mud, grave, and pebbles. Such chipping noise is propagated to the passenger compartment. Thus, such a hard exterior component does not contribute to improvement of quietness in the passenger component, and can be the source of noise in some cases.

To reduce such chipping noise, for example, Japanese Laid-Open Patent Publication No. 2000-264255 discloses a fender liner that is made of a hard fiber plate. The hard fiber plate is formed by bonding fibers with binder, fusion bonding fibers with hot melt resin powder, or heat fusion bonding the mixture of fibers and lower melting point fibers. Japanese Laid-Open Patent Publication No. 2000-264255 discloses that a fender liner made of hard fiber plate is light and has cushioning property, and therefore reduces pitching noise since it softens the impact of collision of dirt, pebbles, and water.

Other than pitching noise, noises that are propagated to the passenger compartment include pattern noise. Pattern noise refers to scratching noise produced by contact between treads (parts that contact the road surface) of tires and the road surface when the vehicle is moving.

To reduce the propagation of noise such as the above described chipping noise and pattern noise to the passenger compartment, for example, Japanese Laid-Open Patent Publication No. 2004-142675, Japanese Laid-Open Patent Publication No. 2004-299626, and Japanese Laid-Open Patent Publication No. 2004-359066 each discloses an exterior component made of sheet material containing nonwoven fabric. Nonwoven fabric is formed by physically intertwining a number of fibers, or tying a number of fibers with binder. An exterior component formed of a sheet material containing such nonwoven fabric has minute spaces (cells) surrounded by intertwined fibers. The cells absorb noises such as pattern noise and chipping noise, thereby reducing the propagation of noises to the passenger compartment. Japanese Laid-Open Patent Publication No. 2004-359066 discloses that a sheet material has a laminated structure of a plurality of stacked layers, and each of the layers has a different function.

In recent years, there is an increasing demand for quietness in vehicle passenger compartments. This trend is applied to all sorts of vehicles. Particularly, the trend is noticeable in hybrid vehicles and fuel cell vehicles, which have been developed in view of minimizing damage to the environment. To meet such needs, latest vehicles tend to have a function to reduce noise produced by power source such as an internal combustion engine and an electric motor, and power transmission system. In addition to reduction of noise produced in such vehicle drive systems, reduction of noise audible in the passenger compartment is an important challenge.

Noises audible in the passenger compartment include road noise in addition to above mentioned chipping noise and pattern noise. Road noise is a muffled noise that is produced when vibration of wheels is transmitted to the vehicle body through suspensions and the vibration of the vehicle body vibrates the air in the passenger compartment. The sources of chipping noise, pattern noise, and road noise cannot be easily removed. Therefore, to reduce audible noise in the passenger compartment, vibration of the vehicle body caused by chipping noise, pattern noise, and road noise needs to be suppressed.

To further reduce noise, the fender liner disclosed in Japanese Laid-Open Patent Publication No. 2000-264255 may be modified to increase the cushioning property, thereby reducing the impact of hitting dirt, pebbles and water (chipping). However, increase in the cushioning property is expected to lower the rigidity. Accordingly, the endurance against is predicted to be lowered. Further, although Japanese Laid-Open Patent Publication No. 2000-264255 discloses reduction of chipping noise, the publication neither disclose nor suggests reduction of scratching noise and muffled noise such as pattern noise or road noise. On the other hand, although Japanese Laid-Open Patent Publication No. 2004-359066 discloses that the sound absorption effect is increased as the number of the cells is increased, a mere increase in the number of cells may reduce the rigidity. Thus, the durability against chipping is predicted to be lowered. Therefore, it is difficult to design an exterior component that satisfies both demands related to the noise reduction capability and the durability against chipping.

In exterior components having nonwoven fabric as disclosed in the above publications, water derived from rain and snow can enter the cells and taken in. An exterior component that has absorbed water increases its weight by the weight of the absorbed water. The increase in the weight can be a cause of deflection and deformation, and reduce the attachment strength of the exterior component with respect to the vehicle body. That is, the rigidity of an exterior component containing nonwoven fabric is sufficient in a normal state, or in a dry state, but insufficient for enduring the increase in weight due to absorbed water. Accordingly, Japanese Laid-Open Patent Publication No. 2004-142675 discloses an exterior component having a water repellent portion so that water does not easily collect on the surface of the exterior component.

However, in the case of an exterior component that contains nonwoven fabric, providing such water repellent portion is not sufficient for completely preventing absorption of water. That is, such a water repellent portion is capable of preventing water that temporarily collects on the surface of the exterior component from being absorbed by the component. However, as for water that is thrown up by a wheel and smashes against the exterior component, and water that stays on the component, the water repellent portion cannot sufficiently suppress such water absorption by the component. To prevent the absorption of water completely, the cells may be blocked. If this is the case, however, sound absorption effect of the cells cannot be obtained. Thus, there is no point in using nonwoven fabric as a material for the exterior component. Therefore, in the case of an exterior component containing nonwoven fabric, it is difficult to eliminate absorption of water and problems caused by such water absorption, while maintaining the sound absorption effect of the cells.

SUMMARY OF THE INVENTION

Accordingly, it is an objective of the present invention to provide an exterior component that exhibits a reliable noise reduction capability, and has a sufficient rigidity to bear a weight increase due to water absorption. Another objective of the present invention to provide an exterior component that improves both of the noise reduction capability and the endurance.

To achieve the foregoing objectives, the present invention provides an exterior component that is attached to an outer surface of a lower part of a vehicle body, and has a shape that corresponds to at least a portion of the body lower part. The exterior component has a surface layer and an inner layer. In a state where the exterior component is attached to the outer surface of the body lower part, the surface layer is the outermost layer, and the inner layer is located between the surface layer and the body lower part. Each of the surface layer and the inner layer is formed by shaping a nonwoven fabric made of a number of fibers into a sheet.

In an aspect of the present invention, the nonwoven fabric forming the inner layer has a higher tensile strength than that of the nonwoven fabric forming the surface layer.

In another aspect of the present invention, the nonwoven fabric forming the surface layer has a higher bulk specific gravity and smaller fiber diameter than the nonwoven fabric forming the inner layer.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereafter, an exterior component according to a first embodiment, which is a fender liner 14, will be described.

Figure 1:
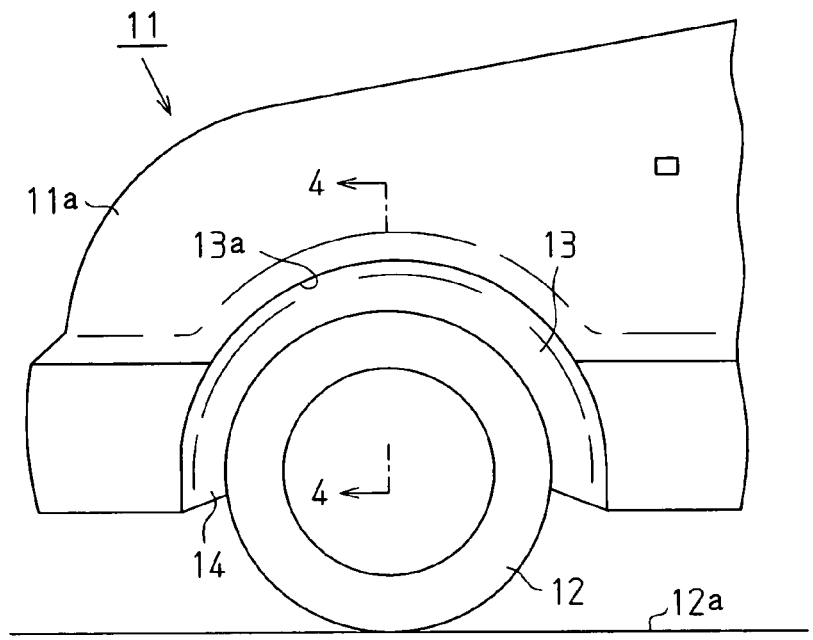
FIG. 1 is a schematic diagram illustrating a part of vehicle equipped with fender liners according to a first embodiment of the present invention.

FIG. 1 shows a front portion of a vehicle 11 having the fender liner 14. Below a fender 11a, which is part of the body of the vehicle 11, a wheel well 13 for accommodating a wheel 12 is provided. The wheel well 13 opens downward and sideward of the vehicle 11, and has an outer surface 13a that faces a road surface 12a. The fender liner 14 is attached to the wheel well 13 to cover the outer surface 13a. The fender liner 14 protects the outer surface 13a for preventing the outer surface 13a from being damaged by pebbles, mud, gravel, rain water, and ice blocks (snow) that are thrown up from the road surface 12a by the wheel 12. Further, the fender liner 14 exhibits a noise reduction capability, and contributes to improvement of quietness in the passenger compartment. Noise reduced by the fender liner 14 includes impact noise produced by pebbles hitting the fender liner 14 (chipping noise), scratching noise produced by contact between the road surface 12a and the wheel 12 when the vehicle 11 is moving (pattern noise), and muffled noise (road noise).

Figure 2:
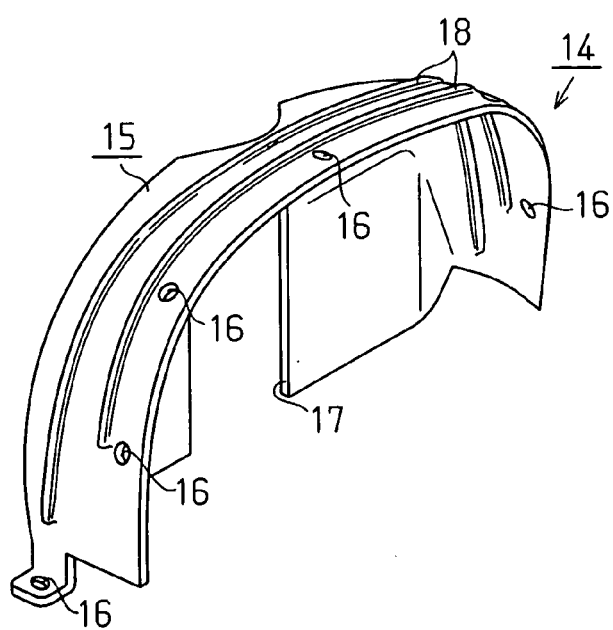
FIG. 2 is a perspective view illustrating the fender liner of FIG. 1, as viewed from the outside of the vehicle.
Figure 3:
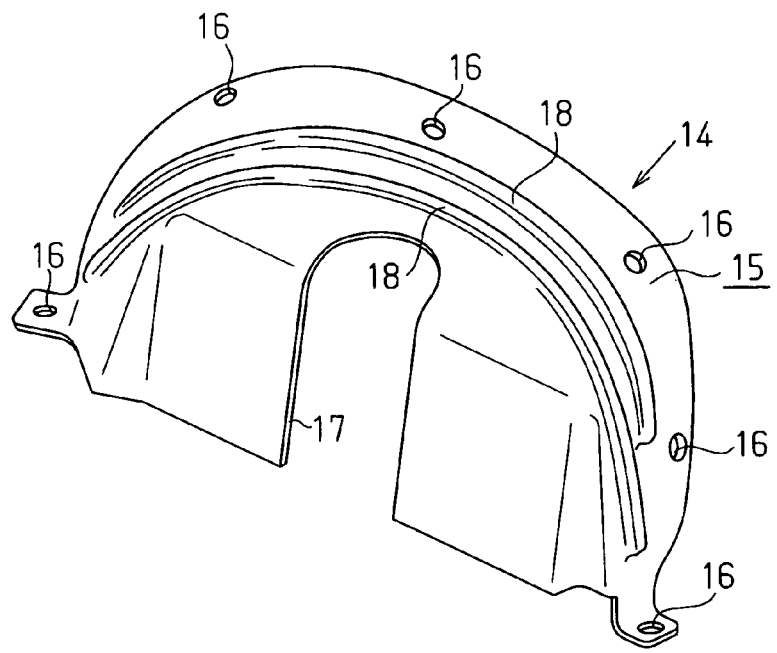
FIG. 3 is a perspective view illustrating the fender liner of FIG. 1, as viewed from the inside of the vehicle.

FIGS. 2 and 3 show the fender liner 14 as viewed from the outside and the inside of the vehicle 11, respectively. The fender liner 14 has a shape that corresponds to the wheel well 13, and is made by shaping a sheet 15 so that it conforms to the outer surface 13a of the wheel well 13. Attachment holes 16 are formed in a rim portion of the fender liner 14 to extend therethrough. Through the attachment holes 16, fasteners such as pins or screws are fitted or screwed with the wheel well 13, so that the fender liner 14 is fixed to the wheel well 13. A cutout (opening) 17 is formed in a center portion of the fender liner 14 to permit a suspension (not shown) supporting the wheel 12 to pass through. The cutout 17 prevents the fender liner 14 from contacting the suspension, thereby preventing noise from being produced by the fender liner 14 contacting the suspension.

Two beads (projections) 18 are provided on the inner surface of the fender liner 14, that is, on a surface that faces the outer surface 13a of the wheel well 13. Each bead 18 is formed by causing the fender liner 14 to project toward the outer surface 13a of the wheel well 13, and has a channel-like cross-section. The beads 18 reinforce the fender liner 14, thereby increasing the rigidity of the fender liner 14. When the fender liner 14 is attached to the wheel well 13, the surface of each bead 18 contacts the outer surface 13a of the wheel well 13. This separates a large portion of the inner surface of the fender liner 14 from the outer surface 13a. Accordingly, an air layer 19 is formed between the inner surface of the fender liner 14 and the outer surface 13a of the wheel well 13 (see FIG. 4).

Figure 4:
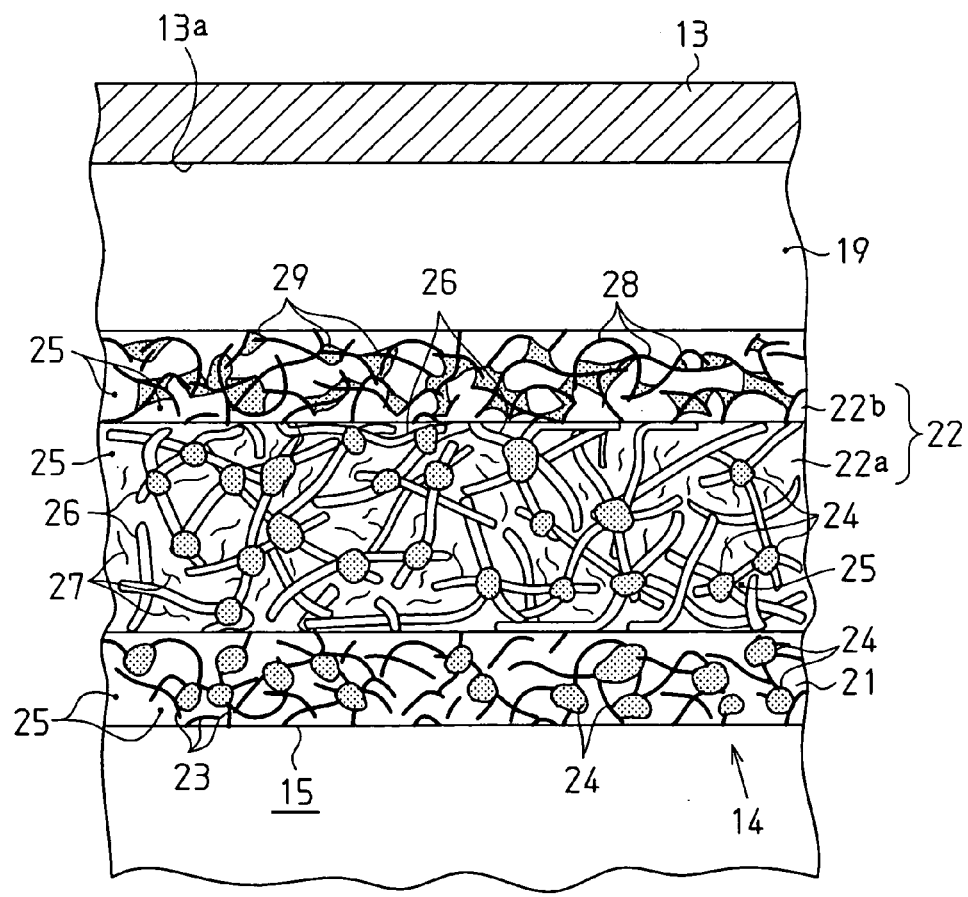
FIG. 4 is a schematic diagram showing a cross-sectional structure of the fender liner taken along line 4-4 of FIG. 1.

As shown in FIG. 4, when the air layer 19 defined by the beads 18 is regarded as a component of the fender liner 14, the fender liner 14 has a laminated structure including a layer of the sheet 15 and the air layer 19. Further, the sheet 15 itself has a laminated structure including a plurality of layers. In this embodiment, the sheet 15 includes three laminated layers. Specifically, the sheet 15 has a surface layer 21 and an inner layer 22, and the inner layer 22 includes a first layer 22a and a second layer 22b. Therefore, the fender liner 14 has a laminated structure of four layers including the surface layer 21, the inner layer 22 (the first layer 22a and the second layer 22b), and the air layer 19. In the state where the fender liner 14 is attached to the outer surface 13a of the wheel well 13, the surface layer 21 forms the outermost layer (the layer that directly faces the wheel 12) of the fender liner 14, and the inner layer 22 is located between the surface layer 21 and the outer surface 13a. In the inner layer 22, the first layer 22a is located adjacent to the surface layer 21, and the second layer 22b directly faces the outer surface 13a of the wheel well 13. Each of the surface layer 21, the first layer 22a, and the second layer 22b is made of a nonwoven fabric sheet made by shaping a number of fibers.

The surface layer 21 is provided for increasing the rigidity (hardness) of the fender liner 14, so that the fender liner 14 endures chipping. When transmitted to the fender liner 14, noises such as chipping noise, pattern noise, and road noise are first transmitted the surface layer 21. The surface layer 21 is thus imparted with sound absorption capability for reducing such noise.

The surface layer 21 includes a number of first fibers 23 and binder particles 24. The first fibers 23 are main fibers of the nonwoven cloth forming the surface layer 21. The binder particles 24 bond the first fibers 23 to one another. The first fibers 23, which are bonded together by the binder particles 24, intertwine with one another, so that the surface layer 21 has a mesh structure. A number of cells 25 are defined in the surface layer 21 having a mesh structure. Each cell 25 is a significantly small space surrounded by first fibers 23. That is, the surface layer 21 is formed as an aggregate of the cells 25. Since the cells 25 absorb sound, the surface layer 21 exhibits a noise reduction function.

Short synthetic fibers are used as the first fibers 23. In this embodiment, polyethylene (PE) fibers are used. Short fibers refer to fibers that are spun to be short from the beginning (staple) and fibers that are formed by cutting long fibers (staple fibers). As the first fibers 23 in this embodiment, staple fibers obtained by cutting waste fibers (recycled fibers) are used since the use of such fibers enables recycling of used seat skin and door panel skin, and reduces the costs.

In terms of reliably maintaining the noise reduction capability while increasing the rigidity of the fender liner 14, the fiber diameter of the first fibers 23 is preferably more than or equal to 5 μm and less than or equal to 20 μm. Fiber diameter refers to a value indicating the size of a fiber. Specifically, fiber diameter refers to the maximum value of a diameter of cross-section of a fiber. If the fiber diameter of the first fibers 23 is less than 5 μm, the first fibers 23 are easily broken. The rigidity of the surface layer 21 is thus likely to be reduced. On the other hand, if the fiber diameter of the first fibers 23 exceeds 20 μm, spaces (cells 25) cannot be easily created among the intertwined first fibers 23, or some of the cells 25 are blocked by first fibers 23. This may reduce the noise reduction capability.

Thermoplastic resin short fibers the melting point of which is lower than that of the first fibers 23 are used for the binder particles 24. The binder particles 24 in this embodiment are filaments that are formed by spinning a low melting point thermoplastic resin. As the filaments, polyolefin fiber, polyester fiber made of polyethylene terephthalate (PET), or polystyrene fiber is preferably used since these are readily available and inexpensive. As the binder particles 24 in this embodiment, filaments made of polypropylene (PP) fiber, which is a type of polyolefin fiber, are used.

The melting point of the thermoplastic resin used for the binder particles 24 is preferably lower than the melding point of the first fibers 23 by 20° C. or more. If the difference between the melting point of the first fibers 23 and the melting point of the binder particles 24 is less than 20° C., it is difficult to melt only the binder particles 24, and melt first fibers 23 blocks some of the cells 25. This may reduce the noise reduction capability.

The melting point of the thermoplastic resin for the binder particles 24 is preferably between 80° C. and 170° C., and more preferably between 100° C. and 170° C. If the melting point is lower than 80° C., heat from the body of the vehicle 11 (for example, heat produced by the engine) softens the binder particles 24, which may deform the fender liner 14. If the melting point exceeds 170° C., it is difficult to shape the fender liner 14 and the workability may be reduced.

In terms of reliably maintaining the noise reduction capability while increasing the rigidity of the fender liner 14, the fiber diameter of the filaments for the binder particles 24 is preferably more than or equal to 10 μm and less than or equal to 50 μm. If the fiber diameter is less than 10 μm, the rigidity of the fender liner 14 may be reduced. If the fiber diameter exceeds 50 μm, the binder particles 24 block the cells 25. This may reduce the noise reduction capability.

The fiber lengths of the first fibers 23 and the binder particles 24 are preferably between 10 and 100 mm. If the fiber lengths are less than 10 mm, a sufficient number of the cells 25 cannot be formed by intertwined fibers, and the noise reduction capability may be reduced. In addition, the degree of intertwining of the fibers becomes insufficient. This may lower the rigidity and durability of the fender liner 14. If the fiber lengths exceed 100 mm, the noise reduction capability may be reduced due to the excessively high fiber density of the first fibers 23.

The fiber density of the nonwoven fabric forming the surface layer 21 is relatively high in terms of increasing the rigidity (hardness) of the fender liner 14. That is, the rigidity of the surface layer 21 is increased by closely arranging fibers (the first fibers 23). In terms of reliably maintaining the rigidity and durability, while obtaining a favorable noise reduction capability, the fiber density of the nonwoven fabric forming the surface layer 21 is preferably is greater than or equal to 0.05 g/cm$^3$ and less than or equal to 0.95 g/cm$^3$. If the fiber density is less than 0.05 g/cm$^3$, it is likely that a sufficient rigidity for enduring chipping cannot be obtained. If the fiber density exceeds 0.95 g/cm$^3$, the fiber density becomes excessive. In this case, it is likely that the cells 25 that exhibit a sufficient noise reduction capability are not formed.

In terms of reliably maintaining the noise reduction capability, while improving the rigidity of the fender liner 14, the areal density of the nonwoven fabric forming the surface layer 21 is preferably greater than or equal to 100 g/m$^2$ and less than or equal to 500 g/m$^2$, more preferably greater than or equal to 200 g/m$^2$ and equal to or less than 300 g/m$^2$. In terms of the same objectives as the case of the areal density, the thickness of the surface layer 21 is preferably greater than or equal to 0.3 mm and less than 8 mm, more preferably greater than or equal to 0.5 mm and less than or equal to 5 mm, and most preferably greater than or equal to 0.5 mm and less than or equal to 2 mm. If the areal density is less than 100 g/m$^2$, or if the thickness is greater than or equal to 8 mm, the fiber density becomes excessively low. This may result in undesirably low rigidity (hardness) of the surface layer 21. Also, water may easily enter the surface layer 21. If the areal density exceeds 500 g/m$^2$, or if the thickness is less than 0.3 mm, the fiber density of the nonwoven fabric forming the surface layer 21 becomes excessive. In this case, it is likely that the cells 25 that exhibit a sufficient noise reduction capability are not formed.

Since water easily collects on the surface layer 21, which is the outermost layer of the fender liner 14, the surface layer 21 is preferably imparted with water repellency. As a method for imparting water repellency to the surface layer 21, a water repellency imparting agent may be applied to the surface the first fibers 23. Alternatively, a water repellency imparting agent may be applied to the nonwoven fabric forming the surface layer 21. Further, the nonwoven fabric may be impregnated with a water repellency imparting agent. For example, silicone rubber may be used as a water repellency imparting agent. In the case where a recycled material is used for the first fibers 23, some recycled car components such as seat skin and door panel skin have been imparted with water repellency. Therefore, it is preferable that a recycled material obtained from car components imparted with repellency be used for the first fibers 23.

The first layer 22a of the inner layer 22 is provided with the primary objective of permitting the fender liner 14 to exhibit a noise reduction capability. Noise such as chipping noise, pattern noise, and road noise that has passed through the surface layer 21 reaches the first layer 22a. Therefore, the first layer 22a has a higher sound absorption capability than the surface layer 21 and the second layer 22b, which form the sheet 15 together with the first layer 22a.

The first layer 22a includes a number of second fibers 26, a number of third fibers 27, and the binder particles 24. The second fibers 26 are main fibers of the nonwoven cloth forming the first layer 22a. The third fibers 27 form the nonwoven fabric together with the second fibers 26, and increase the bulk of the first layer 22a. The binder particles 24 bond the second fibers 26 and the third fibers 27 to one anther. The first layer 22a has a mesh structure with the intertwined second fibers 26, the intertwined third fibers 27, or the intertwined second fibers 26 and third fibers 27. A number of cells 25 are defined in the first layer 22a having a mesh structure. Each cell 25 is a significantly small space surrounded by first fibers 26, 27. That is, the first layer 22a is formed as an aggregate of the cells 25. Since the cells 25 absorb sound, the first layer 22a exhibits a noise reduction function.

Other than the fact that the diameter of the second fibers 26 in the first layer 22a is greater than that of the first fibers 23, the second fibers 26 are basically the same as the first fibers 23 in the surface layer 21. The binder particles 24 in the first layer 22a are the same as the binder particles 24 in the surface layer 21. However, in accordance with the specification of the first layer 22a, the binder particles 24 in the first layer 22a may be formed of PET as the thermoplastic resin. Alternatively, the binder particles 24 in the first layer 22a may be formed of filaments that have a fiber length and a fiber diameter different from those in the binder particle 24 in the surface layer 21.

As in the case of the first fibers 23, polyethylene (PE) fibers are used for the second fibers 26, and staple fibers formed by cutting a recycled material are used. Meanwhile, short fibers formed of polyamide (PA) fibers are used for the third fibers 27. The polyamide fibers (popularly called nylon fibers) are superior in heat resistance, weather resistance, chemical resistance, and fatigue resistance, and contribute to the maintenance of the rigidity of the first layer 22a. Polyamide fibers can be obtained from waste material of an airbag mounted on the vehicle 11. That is, when manufacturing the airbag, remnants of the ground fabric used as the material of the airbag are created. Also, the airbag is separated and collected when the vehicle is scrapped. Using staple fibers obtained by cutting such remnants or waste material are used as the third fibers 27 reduces the manufacturing costs of the fender liner 14.

In terms of maintaining the rigidity of the fender liner 14 while obtaining a favorable noise reduction capability, the fiber diameter of the second fibers 26 is greater than that of the first fibers 23. In this embodiment, the fiber diameter of the second fibers 26 is greater than those of the first fibers 23 and the third fibers 27. However, instead of the second fibers 26, the fiber diameter of the third fibers 27 may be greater than that of the first fibers 23. That is, it is sufficient if the fiber diameter of at least either of the second fibers 26 or the third fibers 27 is greater than that of the first fibers 23. The fiber diameters of the second fibers 26 and the third fibers 27 are preferably greater than or equal to 10 μm and less than or equal to 50 μm. If the fiber diameters are less than 10 μm, it is likely that the rigidity of the fender liner 14 cannot be maintained to a satisfactory level. If the fiber diameters exceed 50 μm, the cells 25 are not easily formed in the first layer 22a. This may reduce the noise reduction capability of the fender liner 14.

In terms of obtaining a favorable noise reduction capability of the fender liner 14, the fiber density of the nonwoven fabric forming the first layer 22a is lower than that of the surface layer 21. The fibers (the second fibers 26 and the third fibers 27) are relatively sparsely provided so that a great number of the cells 25 are formed in the first layer 22a and that the first layer 22a has flexibility. Accordingly, the sound absorption capability of the first layer 22a is increased. In terms of maintaining an appropriate rigidity, while obtaining a favorable sound absorption capability, the fiber density of the nonwoven fabric forming the first layer 22a is preferably is greater than or equal to 0.005 g/cm$^3$ and less than or equal to 0.5 g/cm$^3$. If the fiber density is less than 0.005 g/cm$^3$, the first layer 22a becomes excessively flexible, which reduces the rigidity of the fender liner 14. If the fiber density exceeds 0.5 g/cm$^3$, the fiber density becomes excessive. In this case, it is likely that the cells 25 that exhibit a sufficient noise reduction capability are not formed.

In terms of maintaining the rigidity of the fender liner 14, while obtaining a satisfactory noise reduction capability, the areal density of the nonwoven fabric forming the first layer 22a is set higher than the areal density of the nonwoven fabric forming the surface layer 21. The areal density of the first layer 22a is preferably greater than or equal to 800 g/m$^2$ and less than or equal to 1300 g/m$^2$, more preferably greater than or equal to 1000 g/m$^2$ and equal to or less than 1300 g/m$^2$. In terms of the same objectives as the case of the areal density, the thickness of the first layer 22a is set greater than or equal to 2 mm and less than or equal to 8 mm. If the areal density is less than 800 g/m$^2$, or if the thickness exceeds 8 mm, the fiber density becomes excessively low. This may result in an undesirably low rigidity the first layer 22a. Also, water may easily enter the first layer 22a. If the areal density exceeds 1300 g/m$^2$, or if the thickness is less than 2 mm, the fiber density of the nonwoven fabric forming the first layer 22a becomes excessive. In this case, it is likely that the cells 25 that exhibit a sufficient noise reduction capability are not formed.

The second layer 22b of the inner layer 22 is provided with the primary objective of imparting the fender liner 14 with a sufficient rigidity to bear increase in the weight due to absorption of water. That is, the surface layer 21 and the first layer 22a each have a number of the cells 25 to exhibit a sound absorption capability. Thus, water thrown up by the wheel 12 may enter the surface layer 21 through the cells 25, and soak into the first layer 22a from the surface layer 21. This increases the weight of the surface layer 21 and the first layer 22a, resulting in deformation and deflection of the surface layer 21 and the first layer 22a. To suppress deformation and deflection of the surface layer 21 and the first layer 22a due to such increase in weight, the second layer 22b is configured to have a higher tensile strength than the surface layer 21 and the second layer 22b. The second layer 22b is also imparted with a noise reduction capability in consideration of a case where noise passes through the surface layer 21 and the first layer 22a.

The second layer 22b is formed of nonwoven fabric obtained by spunbonding. Spunbonding refers to a method for obtaining nonwoven fabric by forming a web from synthetic fiber obtained by spinning synthetic resin, and intertwining or bonding the fibers in the synthetic fiber. The second layer 22b in this embodiment includes fourth fibers 28 and adhesive particles 29 functioning as binder. The fourth fibers 28 are synthetic fibers and main fibers of the nonwoven fabric forming the second layer 22b. The adhesive particles 29 bond the fourth fibers 28 to one another. The fourth fibers 28, which are bonded together by the adhesive particles 29, intertwine with one another, so that the second layer 22b has a mesh structure. A number of cells 25 are defined in the second layer 22b having a mesh structure. Each cell 25 is a significantly small space surrounded by fourth fibers 28. That is, the second layer 22b is formed as an aggregate of the cells 25. Since the cells 25 absorb sound, the second layer 22b exhibits a noise reduction function.

The adhesive particles 29 are relatively large and form points of attachment. The fourth fibers 28 are bonded to the adhesive particles 29, or points of attachment. The points of attachment (adhesive particles 29) are connected with one another by the fourth fibers 28. Therefore, the nonwoven fabric forming the second layer 22b has a cross-linked structure in which the fourth fibers 28 and the points of attachment bind one another and reduce displacement relative to one anther. Nonwoven fabric having a cross-linked structure has a moderate elasticity and hardness, and hardly loses shape. Therefore, the second layer 22b exhibits a favorable tensile strength, and suppresses deformation of the surface layer 21 and the first layer 22a due to increase in the weight, thus maintaining the shape of the fender liner 14.

As the fourth fibers 28, synthetic fibers applicable to spunbonding are used. Specifically, synthetic fibers obtained by spinning such as melt spinning, wet spinning, melt blowing, and flash spinning are used. As synthetic resin used as the material of the fourth fibers 28, any type of synthetic resin may be used as long as it is applicable to spunbonding. In this embodiment, polyethylene (PE) fibers are used for the fourth fibers 28. Also, any type of adhesive may be used as the adhesive particles 29 as long as it adheres to the fourth fibers 28. Specifically, the adhesive of the adhesive particles 29 is appropriately selected in accordance with the synthetic resin used as the material of the fourth fibers 28. In this embodiment, an acrylic emulsion adhesive that adheres to polyethylene is used.

In terms of reliably maintaining the noise reduction capability of the fender liner 14, while obtaining a favorable tensile strength, the fiber density of the nonwoven fabric forming the second layer 22b is equal to or lower than that of the surface layer 21. That is, fibers (the fourth fibers 28) are provided in such a density that a cross-linked structure is made, and a number of cells 25 are formed among the fibers. This imparts the second layer 22b with a noise reduction capability and increases the tensile strength of the second layer 22b. In terms of maintaining the noise reduction capability, while obtaining a favorable tensile strength, the fiber density of the nonwoven fabric forming the second layer 22b is preferably is greater than or equal to 0.01 $g/cm^3$ and less than or equal to 0.95 $g/cm^3$. If the fiber density is less than 0.01 $g/cm^3$, a cross-linked structure is not properly established, and a favorable tensile strength cannot be obtained. If the fiber density exceeds 0.95 $g/cm^3$, the fiber density becomes excessive. In this case, it is likely that the cells 25 that exhibit a sufficient noise reduction capability are not formed.

In terms of reliably maintaining the noise reduction capability of the fender liner 14, while obtaining a favorable tensile strength, the areal density of the nonwoven fabric forming the second layer 22b is preferably greater than or equal to 50 $g/m^2$ and less than or equal to 500 $g/m^2$, more preferably greater than or equal to 50 $g/m^2$ and equal to or less than 300 $g/m^2$. In terms of the same objectives as the case of the areal density, the thickness of the second layer 22b is preferably greater than or equal to 0.3 mm and less than 8 mm, more preferably greater than or equal to 0.5 mm and less than or equal to 5 mm, and most preferably greater than or equal to 0.5 mm and less than or equal to 2 mm. If the areal density is less than 50 $g/m^2$, or if the thickness is greater than or equal to 8 mm, the fiber density will be excessively low. This may result in an unsatisfactory tensile strength of the second layer 22b. If the areal density exceeds 500 $g/m^2$, or if the thickness is less than 0.3 mm, the fiber density of the nonwoven fabric forming the second layer 22b becomes excessive. In this case, it is likely that the cells 25 that exhibit a sufficient noise reduction capability are not formed.

A procedure for manufacturing the sheet 15, which is part of the fender liner 14, will now be described.

First, to obtain nonwoven fabric for the surface layer 21, the first layer 22a, and the second layer 22b, fibers and binder particles are opened and deposited, and a web is formed for each of the layers. Then, the webs are stacked and needle-punched. Then, fibers in adjacent webs are intertwined and thus integrated. The integrated webs are pressed with a pressing machine while being heated. This causes the binder to bond the fibers to one another. Consequently, the sheet 15, which is the original fabric of the fender liner 14, is obtained. When shaping the fender liner 14 from the sheet 15, the sheet 15 is pressed into a predetermined shape in the mold of the pressing machine while being heated. Therefore, when shaping the fender liner 14 from the sheet 15, the surface layer 21, the first layer 22a, and the second layer 22b are compressed further.

The sheet 15 includes the laminated surface layer 21, first layer 22a, and second layer 22b. In the state of the sheet 15, that is, prior to the process of shaping, the fender liner 14 has a desired tensile strength required for the molded fender liner 14. That is, the fender liner 14 is formed by heat-pressing the sheet 15 into the predetermined shape. Therefore, after being shaped, the tensile strength of the fender liner 14 does not become less than that in the state of the sheet 15, but equal to or higher than that in the state of the sheet 15. Therefore, it is sufficient that, before being shaped into the fender liner 14, the sheet 15 has a tensile strength not less than the desired tensile strength of the molded fender liner 14. The desired tensile strength corresponds to a tensile strength with which the fender liner 14 bears increase in the weight due to absorption of water. Specifically, the tensile strength of the sheet 15 is preferably greater than or equal to 1500 N along the longitudinal direction, and greater than or equal to 1700 N in the lateral direction. If the tensile strength is less than 1500 N in the longitudinal direction, or less than 1700 N in the lateral direction, deformation of the fender liner 14 may not be reduced when the weight is increased due to absorption of water. The tensile strength is a value measured in accordance with a nonwoven interlining test method specified in JIS L 1085: 1998.

The fender liner 14 configured as described above reliably reduces noise since each of the surface layer 21, the first layer 22a, and the second layer 22b exhibits a soundproofing capability. That is, noise propagated to the passenger compartment of the vehicle 11 includes noise propagated by the medium of air such as pattern nose, and noise propagated by the medium of solid such as the vehicle body such as chipping noise and road noise. In these types of noise, noise that is propagated by the medium of air is reduced by the sound absorption effect of the cells 25. That is, when noise passes through the surface layer 21, the first layer 22a, and the second layer 22b, the cells 25 exhibit the sound absorption effect. Thus, the fender liner 14 absorbs noise that is propagated by the medium of air, and reduces such noise. On the other hand, noise that is propagated by the medium of solid is reduced by vibration suppression effect of the layers forming the fender liner 14. That is, since the fiber densities of the surface layer 21, the first layer 22a, and the second layer 22b are different, the fender liner 14 has both strength and flexibility. Therefore, the fender liner 14 exhibits vibration suppression effect. Specifically, the fender liner 14 is hardly deformed by vibration generated by noise and flexibly absorbs the vibration, thereby reducing the noise that is propagated by the medium of solid.

Further, the air layer 19, which is formed only of air, exhibits both sound absorption effect and vibration suppression effect, and reliably reduces noise that has passed through the surface layer 21, the first layer 22a, and the second layer 22b. That is, when noise that has passed through the surface layer 21, the first layer 22a, and the second layer 22b is propagated through the air layer 19, the air layer 19 exhibits sound absorption effect by displacing the phase of the noise. When the phase is displaced, noise is hardly recognized as disturbing. Even if the surface layer 21, the first layer 22a, the second layer 22b, which are solid, are vibrated by noise, the air layer 19 exhibits a vibration suppression capability. That is, the air layer 19 prevents the fender liner 14 from contacting the wheel well 13, thereby preventing vibration in each layer from being transmitted to the wheel well 13. As a result, the air layer 19 reliably reduces noise propagated by the medium of air and solid.

By changing the volume of the air layer 19, the frequency range of noise that is reduced by the air layer 19 can be adjusted. The volume of the air layer 19 is changed by the height of the beads 18, that is, the thickness of the air layer 19. Specifically, in terms of reliably accommodating the fender liner 14 in the wheel well 13 while improving the noise reduction capability, the thickness of the air layer 19 is preferably set greater than or equal to 5 mm and less than or equal to 40 mm. If the thickness of the air layer 19 is less than 5 mm, the air layer 19 does not exhibit satisfactory sound absorption effect, and may not contribute to the improvement of the noise reduction capability. On the other hand, if the thickness of the air layer 19 exceeds 40 mm, although a sufficient sound absorption effect is obtained, a space required for attaching the fender liner 14 is enlarged. The fender liner 14 therefore may not be fit in the wheel well 13.

In addition, the fender liner 14 not only reduces noise that enters the passenger compartment of the vehicle 11, but also reduces noise leak to the outside of the vehicle 11. That is, the fender liner 14 exhibits the above described sound absorption effect and vibration suppression effect to noise produced inside the vehicle 11, such as engine noise and electric motor noise. Therefore, noise leak to the outside of the vehicle 11 is reduced by the fender liner 14. The vehicle 11 having the fender liner 14 is thus highly environmental conscious.

When the vehicle 11 is moving, pebbles thrown up by the wheel 12 collide with the fender liner 14. At this time, the surface layer 21, which has a relatively high fiber density and a relatively high rigidity, receives the impact of the collision. Meanwhile, the first layer 22a, which has a lower fiber density than that of the surface layer 21 and flexibility, absorbs the impact of the collision. As a result, the chipping noise caused by the collision is suppressed. In the nonwoven fabric forming the surface layer 21, the fibers (the first fibers 23) are closely arranged, and the fiber density is high. Thus, the surface layer 21 has a high surface smoothness, and little fuzzing occurs on the surface of the surface layer 21. This prevents pebbles that have collided with the fender liner 14 from being entangled in the fibers on the surface of the surface layer 21 and stuck on the surface. The fender liner 14 is resistant to soiling. Also, the fibers are prevented from being cut due to removal of entangled pebbles.

When rain water or water of snow collects on the fender liner 14, some of the collected water is repelled by the surface layer 21 having water repellency, and is prevented from being absorbed by the surface layer 21. On the other hand, some water is absorbed by the fender liner 14 from the surface layer 21. Such absorbed water increases the weight of the fender liner 14, and can be a cause of deformation of the fender liner 14. However, since the second layer 22b has a high rigidity, the second layer 22b suppresses deformation of the fender liner 14. In addition, the surface layer 21 has a higher rigidity than that of the first layer 22a, is less likely to be deformed. Therefore, the second layer 22b and the surface layer 21, which have a relatively high rigidity, hold the relatively flexible first layer 22a in between, thereby reliably preventing the first layer 22a from being deformed. In addition, since the second layer 22b is formed of the nonwoven fabric obtained by spunbonding, the cells of the second layer 22b are smaller than the cells of the surface layer 21 and the first layer 22a. Thus, when water enters the air layer 19, absorption of water from the second layer 22b is prevented.

The advantages of the first embodiment will be described below.

(1) The surface layer 21, the first layer 22a, and the second layer 22b forming the fender liner 14 are each formed of nonwoven fabric, and constructed as an aggregate of the cells 25. Since the cells 25 absorb sound, the fender liner 14 reliably reduces noise. The inner layer 22, which has the first layer 22a and the second layer 22b, has a higher tensile strength (rigidity) than that of the surface layer 21. Thus, if the weight of the fender liner 14 increases due to water absorption, the inner layer 22 prevents the fender liner 14 from being deformed by such weight increase. Accordingly, the fender liner 14 exhibits a reliable noise reduction capability, and has a sufficient rigidity to bear a weight increase due to water absorption.

(2) Since the fiber density of the surface layer 21 is greater than or equal to 0.05 g/cm$^3$ and less than or equal to 0.95 g/cm$^3$, the fender liner 14 is imparted with a sufficient durability that endures chipping.

(3) Since, in the surface layer 21, the fiber diameter of the first fibers 23 is greater than or equal to 5 μm and less than or equal to 20 μm, the cells 25 that exhibit sufficient sound absorption effect are formed, and a favorable rigidity of the surface layer 21 is obtained. Also, since the first fibers 23 are not easily cut, the surface layer 21 has a favorable durability.

(4) The air layer 19 is located between the second layer 22b and the outer surface 13a of the wheel well 13. Since the air layer 19 displaces the phase of noise and hinders transmission of vibration of the fender liner 14 due to noise to the body of vehicle 11, the air layer 19 reliably improves the noise reduction capability of the fender liner 14.

(5) The second layer 22b is formed of nonwoven fabric obtained by spunbonding. Therefore, in the second layer 22b, the fourth fibers 28 and the points of attachment (the adhesive particles 29) bind each other, thereby preventing displacement relative to each other. As a result, the inner layer 22, which includes the second layer 22b, exhibits a favorable tensile strength. Since the inner layer 22 has a multiple layer structure including the first layer 22a and the second layer 22b, the layers 22a, 22b can be imparted with different functions. Specifically, the first layer 22a can be imparted with a favorable sound absorption capability, and the second layer 22b can be imparted with a favorable tensile strength.

(6) The relatively soft first layer 22a is held between the surface layer 21 and the second layer 22b, which have a relatively high rigidity. That is, the surface layer 21 and the second layer 22b form an external skeleton that encompasses the relatively soft first layer 22a, thereby imparting the fender liner 14 with a favorable rigidity.

(7) The sheet 15, which includes the laminated surface layer 21, first layer 22a, and second layer 22b, has a tensile strength of not less than 1500 N in the longitudinal direction and a tensile strength of not less than 1700 N in the lateral direction. As a result, the fender liner 14 is imparted with a favorable strength that reliably bears a weight increase due to water absorption.

(8) The nonwoven fabric forming the second layer 22b has the same or lower fiber density compared to that of the nonwoven fabric forming the surface layer 21. Therefore, among the fourth fibers 28 in the second layer 22b, the cells 25 the sizes of which are sufficient for exhibiting a satisfactory sound absorption effect are formed.

(9) The fiber density of the nonwoven fabric forming the second layer 22b is greater than or equal to 0.01 g/cm$^3$ and less than or equal to 0.95 g/cm$^3$. Thus, the second layer 22b has a favorable tensile strength while reliably maintaining the noise reduction capability.

(10) The nonwoven fabric forming the first layer 22a has a lower fiber density than that of the nonwoven fabric forming the surface layer 21. Thus, the first layer 22a exhibits a favorable sound absorption capability while reliably maintaining the durability.

(11) The fiber density of the nonwoven fabric forming the first layer 22a is greater than or equal to 0.005 g/cm$^3$ and less than or equal to 0.5 g/cm$^3$. Thus, the first layer 22a exhibits a favorable sound absorption capability while reliably maintaining the durability.

(12) The fiber diameter of the second fibers 26 in the first layer 22a is greater than the fiber diameter of the first fibers 23. Therefore, the durability of the first layer 22a is reliably maintained while forming a great number of the cells 25 that exhibit a favorable sound absorption capability.

(13) In the first layer 22a, the fiber diameters of the second fibers 26 and the third fibers 27 are greater than or equal to 10 μm and less than or equal to 50 μm. Therefore, the durability of the first layer 22a is reliably maintained while forming a great number of the cells 25 that exhibit a favorable sound absorption capability.

(14) Chipping frequently occurs in the wheel well 13. The wheel well 13 gives passage to noise such as chipping noise, pattern noise, road noise reaching the passenger compartment. The fender liner 14 of this embodiment, which is attached to the wheel well 13, has, as described above, high noise reduction capability and durability. The fender liner 14 thus not only reliably protects the body of the vehicle 11 from chipping, but also, improves the quietness in the passenger compartment. The wheel well 13 is also prone to collection of water. The fender liner 14 of this embodiment, which has a high tensile strength, is hardly deformed by absorption of water, and is therefore suitable to be attached to the wheel well 13.

A second embodiment according to the present invention will now be described. Differences from the first embodiment will be mainly discussed.

Figure 5:
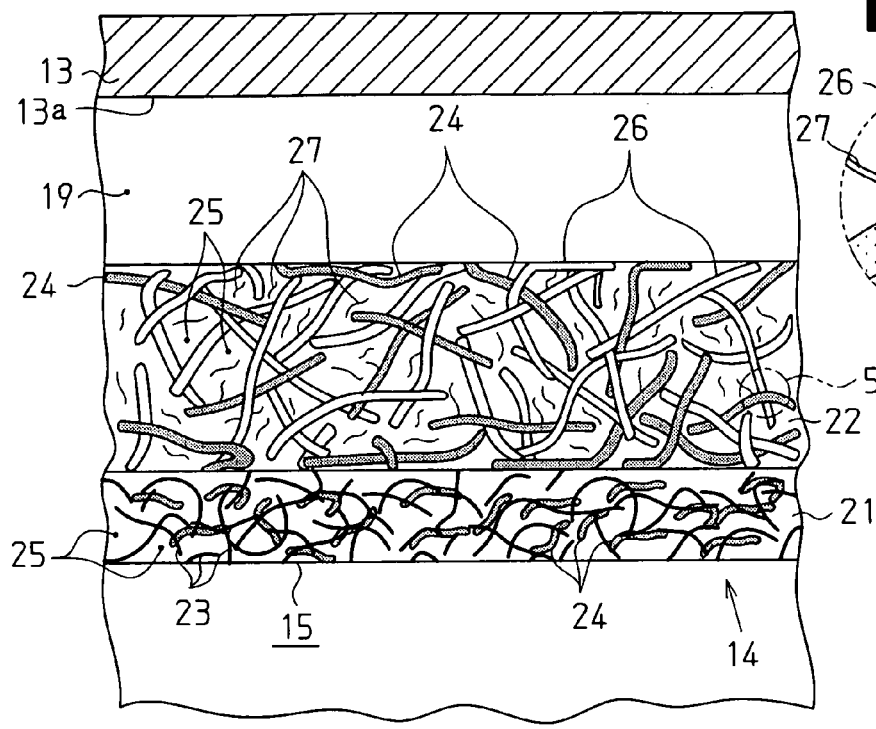
FIG. 5 is a schematic diagram showing a cross-sectional structure of a fender liner according to a second embodiment of the present invention.

FIG. 5 shows a cross-sectional structure of a fender liner 14 according to a second embodiment of the present invention. The fender liner 14 has a laminated structure including a layer of a sheet 15 and the air layer 19. Further, the sheet 15 itself has a laminated structure including a plurality of layers. In this embodiment, the sheet 15 includes two laminated layers, that is, a surface layer 21 and an inner layer 22. Therefore, the fender liner 14 has a laminated structure of three layers including the surface layer 21, the inner layer 22, and the air layer 19. In the state where the fender liner 14 is attached to the outer surface 13a of the wheel well 13, the surface layer 21 forms the outermost layer of the fender liner 14, and the inner layer 22 is located between the surface layer 21 and the outer surface 13a. In this embodiment, the inner layer 22 has a single layer structure unlike the first embodiment. Each of the surface layer 21 and the inner layer 22 is made of a nonwoven fabric sheet formed by shaping a number of fibers. The tensile strength of the inner layer 22 is higher than that of the surface layer 21.

The surface layer 21 has the same structure as the surface layer 21 in the first embodiment except for the binder particles 24. That is, the first fibers 23 used in the surface layer 21 of this embodiment are the same as the first fibers 23 of the first embodiment. As far as the fiber density, the areal density, and the thickness of the nonwoven fabric are concerned, the surface layer 21 of this embodiment is the same as the surface layer 21 of the first embodiment.

The inner layer 22 has the same structure as the first layer 22a in the first embodiment except for the binder particles 24. That is, nonwoven fabric forming the inner layer 22 is formed as an aggregate of the cells 25 with the second fibers 26, the third fibers 27 and the binder particles 24. The second fibers 26 and the third fibers 27 used in the inner layer 22 of this embodiment are the same as the second fibers 26 and the third fibers 27 in the first embodiment. As far as the fiber density, the areal density, and the thickness of the nonwoven fabric are concerned, the inner layer 22 of this embodiment is the same as the first layer 22a of the first embodiment. Therefore, at least either of the second fibers 26 or the third fibers 27 have a larger size than the first fibers 23, the fiber density of the inner layer 22 is less than that of the surface layer 21, and the areal density of the inner layer 22 is greater than that of the surface layer 21.

In the surface layer 21 and the inner layer 22, composite fibers that are obtained by spinning two thermoplastic resins having different melting points are used for the binder particles 24. At least one type of the thermoplastic resins forming the composite fibers has a lower melting point than that of the first fibers 23. As such a thermoplastic resin, polyester such as polyolefin and polyethylene terephthalate (PET), or polystyrene is preferably used.

As the composite fibers, sheath-core type or side-by-side type composite fibers are used. A composite fiber of sheath-core type has a core portion and a sheath covering the surface of the core portion. The melting point of the thermoplastic resin for the sheath portion is lower than the melting point of the thermoplastic resin used for the core portion. In a composite fiber of a sheath-core type, only the sheath portion is melt in a state where the core portion is maintained without being melt, and the melt sheath portion bonds the fibers together. On the other hand, a composite fiber of side-by-side type has a pair of fibers that are fused to each other and extend parallel. The melting point of the thermoplastic resin for one of the fibers is lower than the melting point of the thermoplastic resin used for the other fiber. In a composite fiber of a side-by-side type, only one of the fibers is melt in a state where the other fiber is maintained without being melt, and the melt resin bonds the fibers together. Therefore, when composite fibers are used for the binder particles, melt binder particles are prevented from blocking the cells 25, so that the surface layer 21 and the inner layer 22 have favorable mesh structures.

The fibers forming the layers 21, 22 are adhered to the binder particles 24 made of composite fibers as described above. A great number of points of attachment of the fibers and the binder particles 24 exist in the layers 21, 22, the points of attachment are connected with one another by the binder particles 24. Therefore, the nonwoven fabric forming the layers 21, 22 has a cross-linked structure including the binder particles 24 and the fibers, and has a mesh structure including the binder particles 24 and the fibers. Thus, each of the layers 21, 22 has moderate tension and hardness, and hardly loses shape.

In this embodiment, sheath-core type composite fibers are used as the binder particles 24. In the sheath-core type composite fibers, the cells 25 are formed between unmelted and maintained cores and other fibers. Therefore, the mesh structure formed by the binder particles 24 and the fibers is densified. The mesh structure thus increases the hardness (rigidity) while obtaining a moderate tension. This prevents the shape from being lost. In the sheath-core type composite fiber, the fiber forming the core portion does not need to have a lower melting point than that of the fibers forming the nonwoven fabric (the first fibers 23 in the surface layer 21, the second fibers 26 and the third fibers 27 in the inner layer 22). Rather, the melting point of the fiber forming the core portion is preferably higher than those of the fibers 23, 26, 27. Therefore, in the sheath-core type composite fiber of the present embodiment, the core portion is made of PET, and the sheath portion is made of a modified polyester.

In the binder particles 24 formed of the sheath-core type composite fibers, the melting point of the thermoplastic resin used for the sheath portions is lower than the melting point the thermoplastic resin used for the core portions, than the fibers forming the nonwoven fabric (the first fibers 23 in the surface layer 21, the second fibers 26 and the third fibers 27 in the inner layer 22) by 20° C. or more. If the difference between the melting points is less than 20° C., it is difficult to melt only the sheath portions, and melt fibers block some of the cells 25. This may reduce the sound absorption capability.

The melting point of the thermoplastic resin for the sheath portions is preferably between 80 and 170° C., and more preferably between 100 and 170° C. If the melting point is lower than 80° C., heat from the body of the vehicle 11 (for example, heat produced by the engine) softens the sheath portions, which may deform the fender liner 14. If the melting point exceeds 170° C., it is difficult to shape the fender liner 14 and the workability may be reduced.

In terms of reliably maintaining the noise reduction capability while increasing the rigidity of the fender liner 14, the fiber diameter of the binder particles 24 is preferably more than or equal to 10 μm and less than or equal to 50 μm. If the fiber diameter is less than 10 μm, the core portions may be broken or the sheath portions may not be able to bond the fibers sufficiently firmly. This may result in a lowered durability of the fender liner 14. If the fiber diameter exceeds 50 μm, the binder particles 24 block the cells 25. This may reduce the noise reduction capability.

The manufacture of the sheet 15 and the shaping of the fender liner 14 are performed in the same manner as the first embodiment. In the state of the sheet 15, that is, prior to the process of shaping, the fender liner 14 preferably has a tensile strength of not less than 1400 N in the longitudinal direction and a tensile strength of not less than 1800 N in the lateral direction. If the tensile strength is less than 1400 N in the longitudinal direction, or less than 1800 N in the lateral direction, the fender liner 14 cannot be prevented from deforming when the weight is increased due to absorption of water. The tensile strength is a value measured in accordance with a nonwoven interlining test method specified in JIS L 1085: 1998.

The fender liner 14 configured as described above reliably reduces noise propagated by the medium of air and noise propagated by the medium of solid since each of the surface layer 21 and the inner layer 22 exhibits a soundproofing capability. Also, even if noise has passed through the surface layer 21 and the inner layer 22, the noise is reduced by the air layer 19. In addition, the fender liner 14 not only reduces noise that enters the passenger compartment of the vehicle 11, but also reduces noise leak to the outside of the vehicle 11.

When pebbles thrown up by the wheel 12 collide with the fender liner 14, the surface layer 21 receives the impact of the collision. Meanwhile, the inner layer 22, which has a lower fiber density than that of the surface layer 21 and flexibility, absorbs the impact of the collision. As a result, the chipping noise is suppressed.

If water is absorbed by the fender liner 14 from the surface layer 21, the inner layer 22 prevents the fender liner 14 from being deformed. In addition, since sheath-core type composite fibers are used for the binder particles 24 in the inner layer 22, the densely packed cells 25 are formed in the inner layer 22. Thus, when water enters the air layer 19, the water is unlikely to be taken in by the cells 25 of the inner layer 22, and absorption of water from the inner layer 22 is prevented.

As described above, the fibers 26, 27 forming the inner layer 22 of this embodiment are bonded together with the binder particles 24 of composite fibers. This increases the number of points of attachment of the fibers and the binder particles 24, and the fibers are bound at a great number of points of attachment. This reliably prevents the fibers from being displaced from each other. As a result, the tensile strength of the inner layer 22 is reliably increased, and deformation of the fender liner 14 due to water absorption is reliably prevented.

Since the binder particles 24 formed of composite fibers are used, the cells 25 are prevented from being blocked by melt binder, and the noise reduction capability of the fender liner 14 is reliably maintained.

A third embodiment according to the present invention will now be described. Differences from the first embodiment will be mainly discussed.

Figure 6:
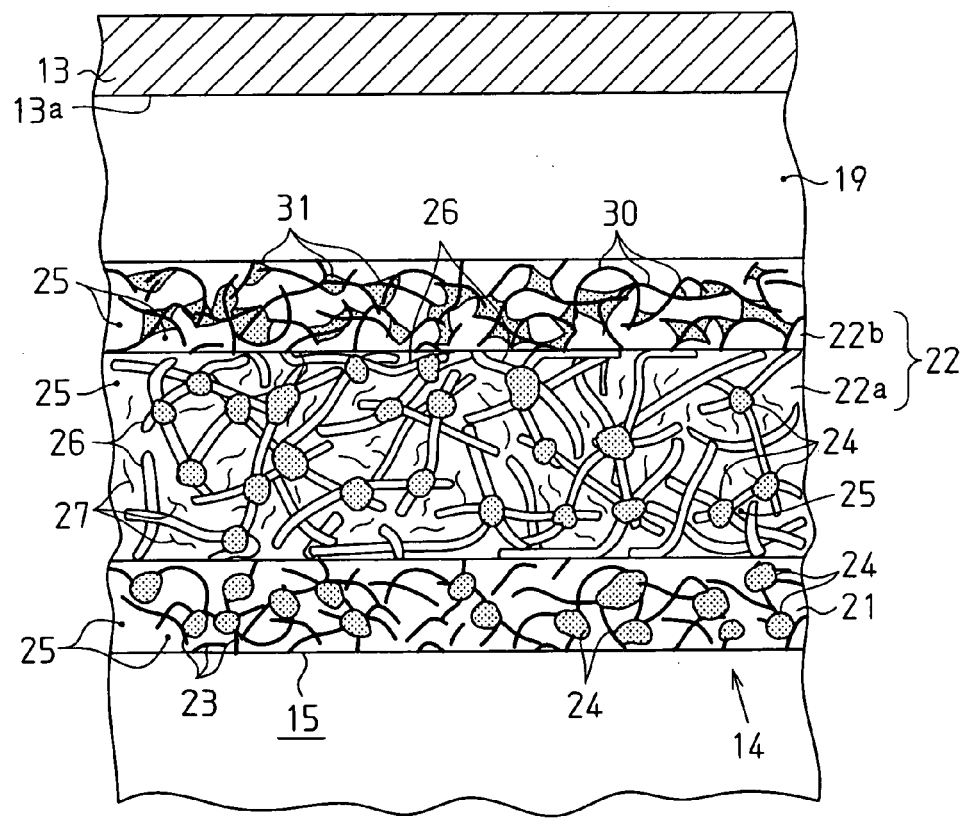
FIG. 6 is a schematic diagram showing a cross-sectional structure of a fender liner according to a third embodiment of the present invention.

FIG. 6 shows a cross-sectional structure of a fender liner 14 according to a third embodiment of the present invention. The fender liner 14 of this embodiment has a similar laminated structure to the fender liner 14 of the first embodiment. That is, the fender liner 14 of this embodiment has a laminated structure that includes the surface layer 21, the inner layer 22 (the first layer 22a and the second layer 22b), and the air layer 19.

The surface layer 21 is the same as the surface layer 21 in the first embodiment. The first layer 22a of the inner layer 22 is the same as the first layer 22a of the first embodiment.

Like the second layer 22b of the first embodiment, the second layer 22b of the inner layer 22 is provided with a primary objective of imparting the fender liner 14 with a sufficient rigidity to bear increase in the weight due to absorption of water. The second layer 22b has a higher tensile strength than those of the surface layer 21 and the second layer 22b, and a noise reduction function. However, the nonwoven fabric that forms the second layer 22b of this embodiment has a different structure from that of the nonwoven fabric that forms the second layer 22b of the first embodiment.

That is, the second layer 22b in this embodiment includes low-elongation fibers 30 and binder particles 31. The low-elongation fibers 30 are synthetic fibers and main fibers of the nonwoven fabric forming the second layer 22b. The low-elongation fibers 30 preferably have a degree of elongation less than 20%, and a tensile strength not less than 6 g/d and not higher than 10 g/d. In this embodiment, as the low-elongation fibers 30, reclaimed PET fibers for tire cords are used. PET fibers for tire cords have higher rigidity than other types of PET fibers.

The binder particles 31 bond the low-elongation fibers 30 to one another. As the binder particles 31, the adhesive particles 29 used in the second layer 22b of the first embodiment may be used. Alternatively, a material other than the adhesive particles 29 may be used. The low-elongation fibers 30, which are bonded together by the binder particles 31, intertwine with one another, so that the second layer 22b has a mesh structure. A number of cells 25 are defined in the second layer 22b having a mesh structure. Each cell 25 is a significantly small space surrounded by low-elongation fibers 30. That is, the second layer 22b is formed as an aggregate of the cells 25. Since the cells 25 absorb sound, the second layer 22b exhibits a noise reduction function. The fiber density and the areal density of the nonwoven fabric that forms the second layer 22b of this embodiment are comparable with those of the nonwoven fabric that forms the second layer 22b of the first embodiment.

The low-elongation fibers 30 increase the rigidity of the second layer 22b, and as a result, the second layer 22b exhibits a favorable tensile strength. Thus, deformation of the fender liner 14 due to water absorption is suppressed by the second layer 22b. The PET fibers for tire cords used for the low-elongation fibers 30 can be obtained from waste material of the tires of the vehicle 11. That is, when manufacturing the tires, remnants of the tire cords used as the material of the tires are created. Also, the tire cords are separated and collected when the vehicle is scrapped. Using PET fibers obtained by cutting and reclaiming such remnants or waste material are used as the low-elongation fibers 30 reduces the manufacturing costs of the fender liner 14.

The manufacture of the sheet 15 and the shaping of the fender liner 14 are performed in the same manner as the first embodiment. The fender liner 14 of this embodiment has the same functions as the fender liner 14 of the first embodiment. That is, the second layer 22b, which has a high tensile strength, reliably suppresses deformation of the fender liner 14 due to water absorption.

Particularly, in this embodiment, the nonwoven fabric forming the second layer 22b has the low-elongation fibers 30 that have a degree of elongation less than 20%, and a tensile strength not less than 6 g/d and not higher than 10 g/d. Therefore, the second layer 22b is imparted with a sufficiently tensile strength for suppressing deformation of the surface layer 21.

In addition, PET fibers for tire cords are used as the low-elongation fibers 30. Since PET fibers for tire cords have a higher rigidity compared to other types of PET fibers, the areal density of the nonwoven fabric forming the second layer 22b can be reduced compared to a case where other types of PET fibers are used. This reduces the weight of the second layer 22b, and the manufacturing costs of the fender liner 14.

The PET fibers for tire cords used for the low-elongation fibers 30 can be obtained from waste material created when manufacturing or discarding tires. This promotes effective use of tire wastes, thereby reducing the manufacturing costs of the fender liner 14.

Figure 5A:
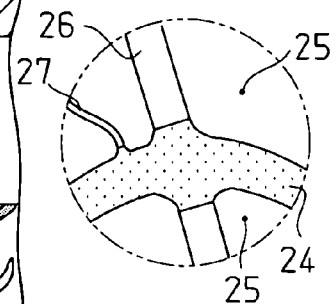
FIG. 5A is an enlarged view showing a section indicated by circle 5A in FIG. 5.

A fourth embodiment of the present invention will now be described. A fender liner 14 according to the fourth embodiment has the same laminated structure as that of the fender liner 14 of the second embodiment shown in FIG. 5, and the structure of the each layer is similar to those of the second embodiment. Accordingly, referring to FIGS. 5 and 5A, the fourth embodiment will hereafter be described by using the same reference numerals as the second embodiment.

As shown in FIG. 5, the surface layer 21 of the fender liner 14 of this embodiment includes a number of first fibers 23 and binder particles (binder fibers) 24. As described above, the fibers in the surface layer 21 are intertwined with one another, so that the surface layer 21 has a mesh structure. Accordingly, a number of cells 25 are defined in the surface layer 21.

The inner layer 22 of the fender liner 14 of this embodiment includes a number of second fibers 26, a number of third fibers 27, and the binder fibers 24 serving as binder particles. As described above, the fibers in the inner layer 22 are intertwined with one another, so that the inner layer 22 has a mesh structure. Accordingly, a number of cells 25 are defined in the inner layer 22.

The nonwoven fabric forming the surface layer 21 has a higher bulk specific gravity than the nonwoven fabric forming the inner layer 22, and thus exhibits a favorable durability against pebbles, mud, gravel, rain water, and ice blocks (snow) that are thrown up by the wheel 12. Bulk specific gravity indicates apparent specific gravity. The higher the value of bulk specific gravity, the higher the value of fiber density of a nonwoven fabric becomes. That is, since the fibers (the first fibers 23) are densely arranged, the surface layer 21 has a higher bulk specific gravity than the inner layer 22, and thus has a higher rigidity than the inner layer 22. Since the surface layer 21 having a high rigidity is attached to the wheel well 13 to be the outermost layer, the fender liner 14 reliably endures chipping.

When the bulk specific density of the nonwoven fabric forming the surface layer 21 is increased, not only the rigidity is increased, but also the smoothness of the surface of the surface layer 21 is improved. That is, if the bulk specific gravity is high, the fibers (the first fibers 23) are densely arranged, and the fiber density becomes high. Thus, fuzzing of the fibers on the surface of the surface layer 21 is reduced. This prevents pebbles that have been thrown up by the wheel 12 from being entangled in the fibers on the surface of the surface layer 21 and stuck on the surface. The fender liner 14 is therefore resistant to soiling. Also, the fibers are prevented from being cut due to removal of entangled pebbles.

As described above, the fender liner 14 reliably reduces noise propagated by the medium of air by means of sound absorption effect of the cells 25. The fender liner 14 also reduces noise propagated by the medium of solid by means of vibration suppression effect of the layers having different bulk specific gravities (fiber densities). Further, since the air layer 19 exhibits sound absorption effect and vibration suppression effect, the fender liner 14 reliably reduces noise propagated by the medium of air and solid. In addition, the fender liner 14 not only reduces noise that enters the passenger compartment of the vehicle 11, but also reduces noise leak to the outside of the vehicle 11.

As described in the first embodiment, the thickness of the air layer 19 is greater than or equal to 5 mm and less than or equal to 40 mm. The sound-absorption coefficient at 2000 Hz was measured for each of the cases in which the thickness of the air layer 19 was changed to among 0 mm, 5 mm, 10 mm, 20 mm, and 40 mm. When the thickness was 0 mm, the sound-absorption coefficient was 7%, when the thickness was 5 mm, the sound-absorption coefficient was 30%, when the thickness was 10 mm, sound-absorption coefficient was 63%, when the thickness was 20 mm, sound-absorption coefficient was 90%, and when the thickness was 40 mm, the sound-absorption coefficient was 95%. Based on these results, it was found that if the thickness of the air layer 19 is greater than or equal to 5 mm and less than or equal to 40 mm, the fender liner 14 is imparted with a favorable noise reduction capability.

The fender liner 14 is believed to exhibit a sound insulating effect as well. That is, since the surface layer 21, which has a high bulk specific gravity, is less likely to produce vibration due to noise, and is therefore predicted to exhibit sound insulation effect to suppress the propagation of vibration due to noise. Thus, the fender liner 14 exhibits sound insulating effect against noise that is propagated by the medium of air, and reduces such noise.

In terms of reliably maintaining the durability while obtaining a favorable noise reduction capability, the bulk specific gravity of the nonwoven fabric forming the surface layer 21 is preferably is greater than or equal to 0.3 g/cm$^3$ and less than or equal to 0.8 g/cm$^3$. If the bulk specific gravity is less than 0.3 g/cm$^3$, it is likely that a sufficient endurance for enduring chipping cannot be obtained. If the bulk specific gravity surpasses 0.8 g/cm$^3$, the fiber density becomes excessive. In this case, it is likely that the cells 25 that exhibit a sufficient noise reduction capability are not formed.

The thickness of the surface layer 21 is preferably in a range between 2 and 8 mm, inclusive, more preferably in a range between 2 and 6 mm, inclusive, and most preferably in a range between 2 and 4 mm, inclusive. If the thickness is less than 2 mm, the bulk specific gravity of the nonwoven fabric forming the surface layer 21 becomes excessive. It is therefore likely that the surface layer 21 cannot exhibit a favorable noise reduction capability. On the other hand, if the thickness surpasses 8 mm, the bulk specific gravity becomes excessively low. It is therefore likely that the surface layer 21 cannot exhibit a favorable endurance.

As in the second embodiment, in terms of forming the cells 25 that exhibit a sufficient noise reduction capability, the fiber diameter of the first fibers 23, which are the main fibers forming the surface layer 21, is smaller than that of the second fibers 26, which are the main fibers of the nonwoven fabric forming the inner layer 22. By making the fiber diameter of the first fibers 23 less than that of the second fibers 26, the surface layer 21 is likely to have the cells 25 smaller than those in the inner layer 22. Even if the bulk specific gravity is made higher than that of the inner layer 22, the cells 25 sufficient for exhibiting a sound absorption capability are formed in the surface layer 21. Thus, the fender liner 14 exhibits both of endurance and noise reduction capability.

In terms of obtaining a favorable noise reduction capability while reliably maintaining the durability, the fiber diameter of the first fibers 23 is greater than or equal to 50% and less than or equal to 90% of the fiber diameter of the second fibers 26. If the fiber diameter of the first fibers 23 is less than 50% of the fiber diameter of the second fibers 26, the rigidity of the surface layer 21 is lowered, and it is likely that a sufficient rigidity for enduring chipping cannot be obtained. On the other hand, if the fiber diameter of the first fibers 23 exceeds 90% of that of the second fibers 26, it is likely that the cells 25 sufficient for exhibiting a sound absorption capability are not formed. In this case, a noise reduction capability may not be reliably exhibited. As in the second embodiment, the fiber diameter of the first fibers 23 is greater than or equal to 5 µm and less than or equal to 20 µm.

Short synthetic fibers are used as the first fibers 23 and the second fibers 26. In this embodiment, polyester (specifically, polyethylene terephthalate (PET)) fibers are used. As described above, staple fibers obtained by cutting waste fibers (recycled fibers) are preferably used as the first fibers 23 and the second fibers 26. As in the second embodiment, short fibers formed of polyamide (PA) fibers are used for the third fibers 27. The fiber diameter of the third fibers 27 is greater than or equal to 10 µm and less than or equal to 50 µm. Staple fibers obtained by cutting waste fibers (recycled fibers) may also be used as the third fibers 27. The fiber lengths of the first to third fibers 23, 26, 27 and the binder fibers 24 are between 10 and 100 mm for the above described reasons.

As in the second embodiment, in terms of reliably forming the cells 25, sheath-core type composite fibers are used as the binder fibers 24. As in the second embodiment, the fiber diameter of the binder fibers 24 is greater than or equal to 10 µm and less than or equal to 50 µm. The melting point of the binder fibers 24 is as explained in the second embodiment.

The fourth embodiment thus explained has the following advantages in addition to the advantages listed in the above embodiments.

(1) The nonwoven fabric forming the surface layer 21 has a higher bulk specific gravity than that of the nonwoven fabric forming the inner layer 22. The first fibers 23 have a smaller fiber diameter than that of the second fibers 26. As a result, while improving the rigidity of the surface layer 21, the cells 25 that exhibit a sufficient noise reduction effect are formed. Therefore, a favorable durability is obtained while obtaining a favorable noise reduction capability.

(2) The bulk specific gravity of the nonwoven fabric forming the surface layer 21 is greater than or equal to 0.3 g/cm$^3$ and less than or equal to 0.8 g/cm$^3$. Thus, reduction of the durability of the fender liner 14 due to an excessively low bulk specific gravity is suppressed. Also, reduction of the noise reduction capability of the fender liner due to an excessively high bulk specific gravity is suppressed.

(3) The fiber diameter of the first fibers 23 is greater than or equal to 50% and less than or equal to 90% of the fiber diameter of the second fibers 26. Therefore, the number of the cells 25 in the surface layer 21 is prevented from being excessively great compared to that of the inner layer 22. Accordingly, reduction of the durability of the fender liner 14 due to such an excessive number of the cells 25 is suppressed. Also, the number of the cells in the surface layer 21 is prevented from being excessively small compared to that of the inner layer 22. Accordingly, reduction of the noise reduction capability of the fender liner 14 due to an excessively small number of the cells 25 is suppressed.

(4) Polyamide fibers are used for the third fibers 27 contained in the nonwoven fabric forming the inner layer 22. The fender liner 14 is therefore imparted with superior characteristics of polyamide fibers, such as heat resistance, weather resistance, chemical resistance, and fatigue resistance.

It should be noted that the present embodiment can be modified to provide following variations thereof.

The first to third fibers 23, 26, 27 do not necessarily have to be formed of synthetic fibers such as PET fibers and PA fibers, but may be formed of inorganic fiber (for example, glass fiber, ceramic fiber), or natural fiber (for example, cellulose fibers such as cotton and rayon and protein fibers such as silk and wool). Alternatively, at least two of synthetic fibers, inorganic fibers, and natural fibers may be mixed.

The inner layer 22 of the second and fourth embodiments may be formed of nonwoven fabric containing the low-elongation fibers 30 as described in the third embodiment. In the case where the sheet 15 has a single layer structure, the sheet 15 may be made of nonwoven fabric containing the low-elongation fibers 30. In these cases, as the low-elongation fibers 30, reclaimed PET fibers for tire cords preferably are used.

The fender liner 14 may be black tinted, gray tinted, or brown tinted.

Other than the fender liner 14, the exterior component of the present invention may be embodied as any type of component that is attached to a lower part of the body of the vehicle 11. For example, the exterior component of the present invention may be embodied as a quarter liner attached to a wheel well provided in a rear fender of the vehicle 11, or a protector fuel cover. Alternatively, the exterior component of this invention may be embodied as an under protector that covers the lower side of the body of the vehicle 11. Further, the exterior component of this invention may be embodied as spats that are attached to a section in the vicinity of the front end of the wheel well 13.

The air layer 19 may be omitted. In this case, the inner layer 22 of the fender liner 14 contacts the outer surface 13a of the wheel well 13.

The binder (binder particles and binder fibers) is not limited to the ones listed in the above embodiments, but may be granule, powder, or liquid as long as it adheres to fibers and imparts the fibers a desired tensile strength. The binder particles 24 formed of sheath-core type composite fibers used in the second and fourth embodiments may be used in at least one of the surface layer 21 and the first layer 22a of the first embodiment. Alternatively, the binder particles 24 used in the first embodiment may be used in at least one of the surface layer 21 and the inner layer 22 of the second and fourth embodiments.

The third fibers 27 may be omitted, and the first layer 22a or the inner layer 22 may be formed only of the second fibers 26 and the binder particles 24.

The fender liner 14 may have a laminated structure other than the laminated structures described in the above embodiments. For example, a layer formed of a sound insulator such as a metal sheet and an asphalt sheet may be proved between the surface layer 21 and the inner layer 22, or on the surface of the inner layer 22. In a case where such an addition layer is provided, the additional layer preferably has a number of pores such as the cells 25.

The fender liner 14, which is an exterior component, does not need to have a laminated structure in its entirety, but may be shaped to have a partly laminated structure.

The invention claimed is:

1. An exterior component that is attached to an outer surface of a lower part of a vehicle body, the component having a shape that corresponds to at least a portion of the body lower part, the component comprising:
    a surface layer, wherein, in a state where the exterior component is attached to the outer surface of the body lower part, the surface layer is the outermost layer, the surface layer being formed by shaping a nonwoven fabric made of a number of fibers into a sheet; and
    an inner layer, wherein, in a state where the exterior component is attached to the outer surface of the body lower part, the inner layer is located between the surface layer and the body lower part, the inner layer being formed by shaping a nonwoven fabric made of a number of fibers into a sheet, wherein the nonwoven fabric forming the inner layer has a higher tensile strength than that of the nonwoven fabric forming the surface layer.

2. The exterior component according to claim 1, wherein the fiber density of the nonwoven fabric forming the surface layer is greater than or equal to 0.05 g/cm$^3$ and less than or equal to 0.95 g/cm$^3$.

3. The exterior component according to claim 1, wherein the fiber diameter of the nonwoven fabric forming the surface layer is greater than or equal to 5 μm and less than or equal to 20 μm.

4. The exterior component according to claim 1, further comprising an air layer formed between the inner layer and the body lower part.

5. The exterior component according to claim 1, wherein the nonwoven fabric forming the inner layer has fibers that have a degree of elongation less than 20% and a tensile strength greater than or equal to 6 g/d and less than or equal to 10 g/d.

6. The exterior component according to claim 1, wherein the inner layer has a multiple layer structure including at least a first layer and a second layer, and wherein the nonwoven fabric forming the second layer has a higher tensile strength than that of the nonwoven fabric forming the surface layer.

7. The exterior component according claim 6, wherein the first layer is located between the surface layer and the second layer.

8. The exterior component according to claim 6, wherein the nonwoven fabric forming the second layer has fibers that have a degree of elongation less than 20% and a tensile strength greater than or equal to 6 g/d and less than or equal to 10 g/d.

9. The exterior component according to claim 6, wherein the nonwoven fabric forming the second layer is obtained by spunbonding.

10. The exterior component according to claim 9, wherein the exterior component is obtained by shaping a sheet that includes the laminated surface layer, first layer, and second layer, wherein, when measured in accordance with a nonwoven interlining test method specified in JIS L 1085: 1998, the sheet has a tensile strength of not less than 1500 N in a longitudinal direction and a tensile strength of not less than 1700 N in a lateral direction.

11. The exterior component according to claim 6, wherein the nonwoven fabric forming the second layer has a fiber density equal to or less than that of the nonwoven fabric forming the surface layer.

12. The exterior component according to claim 6, wherein the fiber density of the nonwoven fabric forming the second layer is greater than or equal to 0.01 g/cm$^3$ and less than or equal to 0.95 g/cm$^3$.

13. The exterior component according to claim 6, wherein the nonwoven fabric forming the first layer has a fiber density less than that of the nonwoven fabric forming the surface layer.

14. The exterior component according to claim 6, wherein the fiber density of the nonwoven fabric forming the first layer is greater than or equal to 0.005 g/cm$^3$ and less than or equal to 0.5 g/cm$^3$.

15. The exterior component according to claim 6, wherein the nonwoven fabric forming the first layer has a fiber diameter greater than that of the nonwoven fabric forming the surface layer.

16. The exterior component according to claim 6, wherein the fiber diameter of the nonwoven fabric forming the first layer is greater than or equal to 10 μm and less than or equal to 50 μm.

17. The exterior component according to claim 6, wherein the nonwoven fabric forming the first layer has an areal density greater than that of the nonwoven fabric forming the surface layer.

18. The exterior component according to claim 1, wherein the nonwoven fabric forming the inner layer contains a binder for bonding fibers together, and wherein the binder includes composite fibers each obtained by spinning at least two thermoplastic resin having different melting points.

19. The exterior component according to claim 18, wherein the exterior component is obtained by shaping a sheet that includes the laminated surface layer and inner layer, wherein, when measured in accordance with a nonwoven interlining test method specified in JIS L 1085: 1998, the sheet has a tensile strength of not less than 1400 N in a longitudinal direction and a tensile strength of not less than 1800 N in a lateral direction.

20. The exterior component according to claim 18, wherein the nonwoven fabric forming the inner layer has a fiber density less than that of the nonwoven fabric forming the surface layer.

21. The exterior component according to claim 18, wherein the fiber density of the nonwoven fabric forming the inner layer is greater than or equal to 0.005 g/cm$^3$ and less than or equal to 0.5 g/cm$^3$.

22. The exterior component according to claim 18, wherein the nonwoven fabric forming the inner layer has a fiber diameter greater than that of the nonwoven fabric forming the surface layer.

23. The exterior component according to claim 18, wherein the fiber diameter of the nonwoven fabric forming the inner layer is greater than or equal to 10 μm and less than or equal to 50 μm.

24. The exterior component according to claim 18, wherein the nonwoven fabric forming the inner layer has an areal density greater than that of the nonwoven fabric forming the surface layer.

25. The exterior component according to claim 1, wherein the component is configured as a fender liner that covers the outer surface of a wheel well provided at the body lower part.

26. An exterior component that is attached to an outer surface of a lower part of a vehicle body, the component having a shape that corresponds to at least a portion of the body lower part, the component comprising:
   a surface layer, wherein, in a state where the exterior component is attached to the outer surface of the body lower part, the surface layer is the outermost layer, the surface layer being formed by shaping a nonwoven fabric made of a number of fibers into a sheet; and
   an inner layer, wherein, in a state where the exterior component is attached to the outer surface of the body lower part, the inner layer is located between the surface layer and the body lower part, the inner layer being formed by shaping a nonwoven fabric made of a number of fibers into a sheet, wherein the nonwoven fabric forming the surface layer has a higher bulk specific gravity and a smaller fiber diameter than those of the nonwoven fabric forming the inner layer.

27. The exterior component according to claim 26, wherein the nonwoven fabric forming the inner layer includes polyamide fibers.

28. The exterior component according to claim 26, wherein the bulk specific gravity of the nonwoven fabric forming the surface layer is greater than or equal to 0.3 g/cm$^3$ and less than or equal to 0.8 g/cm$^3$.

29. The exterior component according to claim 26, wherein the fiber diameter of the nonwoven fabric forming the surface layer is greater than or equal to 50% and less than or equal to 90% of the fiber diameter of the nonwoven fabric forming the inner layer.

30. The exterior component according to claim 26, wherein the fiber diameter of the nonwoven fabric forming the surface layer is greater than or equal to 5 μm and less than or equal to 20 μm.

31. The exterior component according to claim 26, wherein at least one of the nonwoven fabric forming the surface layer and the nonwoven fabric forming the inner layer contains a binder for bonding fibers together, and wherein the binder is provided as fibers.

32. The exterior component according to claim 26, further comprising an air layer formed between the inner layer and the body lower part.

33. The exterior component according to claim 26, wherein the component is configured as a fender liner that covers the outer surface of a wheel well provided at the body lower part.

* * * * *